United States Patent
Rubi (10) Patent No.: US 12,045,509 B2
(45) Date of Patent: Jul. 23, 2024

(54) DATA STORAGE DEVICE WITH WEAK BITS HANDLING

(71) Applicant: Western Digital Technologies, Inc., San Jose, CA (US)

(72) Inventor: Refael Ben Rubi, Rosh Haayln, IL (US)

(73) Assignee: Sandisk Technologies, Inc., Austin, TX (US)

( * ) Notice: Subject to any disclaimer, the term of this patent is extended or adjusted under 35 U.S.C. 154(b) by 96 days.

(21) Appl. No.: 17/843,641

(22) Filed: Jun. 17, 2022

(65) Prior Publication Data

US 2023/0409237 A1 Dec. 21, 2023

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC ..... G06F 3/0659; G06F 3/0604; G06F 3/0679
USPC ........................................................ 711/149
See application file for complete search history.

(56) References Cited

U.S. PATENT DOCUMENTS

| | | | |
|---|---|---|---|
| 6,493,266 B1 * | 12/2002 | Yachareni | G11C 16/3404 365/185.24 |
| 6,819,589 B1 | 11/2004 | Aakjer | |
| 7,023,735 B2 * | 4/2006 | Ban | G11C 16/26 365/185.24 |
| 7,362,610 B1 * | 4/2008 | Salter, III | G11C 16/3418 365/185.24 |
| 8,694,853 B1 | 4/2014 | Sommer | |
| 8,935,467 B2 | 1/2015 | Yu et al. | |
| 9,922,726 B2 | 3/2018 | Choi | |
| 10,528,420 B2 | 1/2020 | Kwak et al. | |
| 10,553,279 B2 | 2/2020 | Shimizu | |
| 2006/0187724 A1 * | 8/2006 | Pineda De Gyvez | G11C 29/50 365/201 |
| 2008/0106956 A1 * | 5/2008 | Pineda De Gyvez | G11C 29/50 365/201 |
| 2011/0141811 A1 * | 6/2011 | Shimizu | G11C 16/12 365/185.03 |
| 2011/0299349 A1 * | 12/2011 | Deng | G11C 29/50 365/201 |
| 2013/0308381 A1 * | 11/2013 | Alrod | G06F 11/1072 365/185.03 |

(Continued)

*Primary Examiner* — Titus Wong
(74) *Attorney, Agent, or Firm* — PATTERSON + SHERIDAN, LLP (57) ABSTRACT

A data storage device includes a non-volatile memory device that includes at least a first wordline having first data and a second wordline sequential and adjacent to the first wordline and a controller coupled to the non-volatile memory device. The controller is configured to receive a write command to program second data to the second wordline, read and store the first data from the first wordline a in a first location prior to programming the second data, program the second data to the second wordline, re-read and store the first data from the first wordline in a second location during the programming, compare the read first data and the re-read first data, and mark one or more bits of the first wordline that are different based on the comparing. The marked one or more bits are used as soft bits in future read and decode operations.

20 Claims, 5 Drawing Sheets

(56) References Cited

U.S. PATENT DOCUMENTS

| | | | |
|---|---|---|---|
| 2014/0304560 A1* | 10/2014 | Narasimha | G06F 11/076 714/704 |
| 2014/0362646 A1* | 12/2014 | Sharon | G11C 16/0483 365/185.17 |
| 2016/0163382 A1* | 6/2016 | Conley | G11C 16/3459 365/185.03 |

* cited by examiner

DATA STORAGE DEVICE WITH WEAK BITS HANDLING

BACKGROUND OF THE DISCLOSURE

Field of the Disclosure

Embodiments of the present disclosure generally relate to data storage devices, such as solid state drives (SSDs), and, more specifically, determining weak bits during data storage device operation.

Description of the Related Art

Memory devices, such as non-volatile memory devices, of a data storage device include a plurality of cells, where the plurality of cells are arranged in an array. The memory device includes a plurality of dies, where each die includes a first plane and a second plane. The first plane and the second plane each includes a plurality of blocks, where each block of the plurality of blocks includes a plurality of pages. Each page of the plurality of pages includes a plurality of cells. Data is programmed from a wordline to an adjacent wordline, where the programming is sequential. The wordline may span across one or more pages, such that each wordline includes a plurality of cells.

In order to store data, a charge is stored in each cell. Based on the memory architecture of the memory device, the cell may have a number of cell states. For example, if the memory device is a triple-level cell (TLC) memory device, then each cell may store 3 bits. Each of the 3 bits may either be a 0 or a 1. Therefore, the number of cell states possible is 8, where each cell state has a different voltage range. In other words, the number of cell states for a cell is dependent on the number of bits that the cell may store, such that the number of cell states satisfies the following equation: # of cell states=$2^n$, where n is equal to the number of bits that the cell may store.

During manufacturing of the memory device, the cells of the memory device may be tested, such that any defective or weak cells are ignored by the data storage device during data storage device operation. In other words, the defective or weak cells found during the testing process during manufacturing of the memory device may not be used during the operation of the data storage device. Likewise, due to use, cells of the memory device of the data storage device may experience lower durability, such that the cells may no longer hold a charge. For example, after a certain number of program and erase cycles, the insulation of the floating gate transistor of a cell may be degraded and a stored charge may be able to escape from the floating gate transistor. Likewise, programming operations occurring to an adjacent wordline to a previously programmed wordline may affect the charge stored in the cells of the previously programmed wordline. Thus, when reading data from a cell with a degraded floating gate transistor or from an adjacent wordline, the bits may be different from the bits originally stored.

Therefore, there is a need in the art for an improved detection of weak bits in a memory device of the data storage device.

SUMMARY OF THE DISCLOSURE

The present disclosure generally relates to data storage devices, such as solid state drives (SSDs), and, more specifically, determining weak bits during data storage device operation. A data storage device includes a non-volatile memory device that includes at least a first wordline having first data and a second wordline sequential and adjacent to the first wordline and a controller coupled to the non-volatile memory device e. The controller is configured to receive a write command to program second data to the second wordline, read and store the first data from the first wordline in a first location prior to programming the second data, program the second data to the second wordline, re-read and store the first data from the first wordline in a second location during the programming, compare the read first data and the re-read first data, and mark one or more bits of the first wordline that are different based on the comparing. The marked one or more bits are used as soft bits in future read and decode operations.

In one embodiment, a data storage device includes a non-volatile memory device having at least a first wordline and a second wordline, where the second wordline is sequential and adjacent to the first wordline, and where the first wordline comprises first data, a volatile memory device, and a controller coupled to the non-volatile memory device and the volatile memory device. The controller is configured to receive a write command to program second data to the second wordline, prior to programming the second data to the second wordline, read the first data from the first wordline and store the read first data in a first location of the volatile memory device, where the read first data includes a plurality of first bits, program the second data to the second wordline, during the programming, re-read the first data from the first wordline and store the re-read first data in a second location of the volatile memory device, where the re-read first data includes a plurality of second bits, compare the plurality of first bits to the plurality of second bits, and mark one or more bits of the first wordline that are different based on the comparing.

In another embodiment, a data storage device includes a memory device and a controller coupled to the memory device. The controller is configured to receive a write command for a wordline of the memory device, read a previously programmed wordline of the memory device, where the previously programmed wordline is adjacent to the wordline, store the read previously programmed wordline in a first buffer, execute the write command for the wordline, during the executing, re-read the previously programmed wordline, store the re-read previously programmed wordline in a second buffer, determine that one or more bits of the stored read previously programmed wordline are different than the stored re-read previously programmed wordline, and mark the one or more bits of the previously programmed wordline that are different based on the determining, and store a location corresponding to the marked one or more bits of the previously programmed wordline that are different in a volatile memory device of the data storage device.

In another embodiment, a data storage device includes non-volatile memory means, volatile memory means, and a controller coupled to the non-volatile memory means and the volatile memory means. The controller includes a flash state machine. The flash state machine is configured to receive a write command to write second data to a second wordline, where the second wordline is sequential and adjacent to a first wordline, read first data of the first wordline for a first time, program the second write data to the second wordline, read the first data of the first wordline for a second time, compare the first data read for the first time to the first data read for the second time, mark one or more bits of the first wordline that are different based on the comparing, and store location information of the marked one or more bits in volatile memory means.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, determining weak bits during data storage device operation. A data storage device includes a non-volatile memory device that includes at least a first wordline having first data and a second wordline sequential and adjacent to the first wordline, a volatile memory device, and a controller coupled to the non-volatile memory device and the volatile memory device. The controller is configured to receive a write command to program second data to the second wordline, read the first data from the first wordline and store the read first data in a first location prior to programming the second data, program the second data to the second wordline, re-read the first data from the first wordline and store the re-read first data in a second location during the programming, compare the read first data and the re-read first data, and mark one or more bits of the first wordline that are different based on the comparing.

Figure 1:
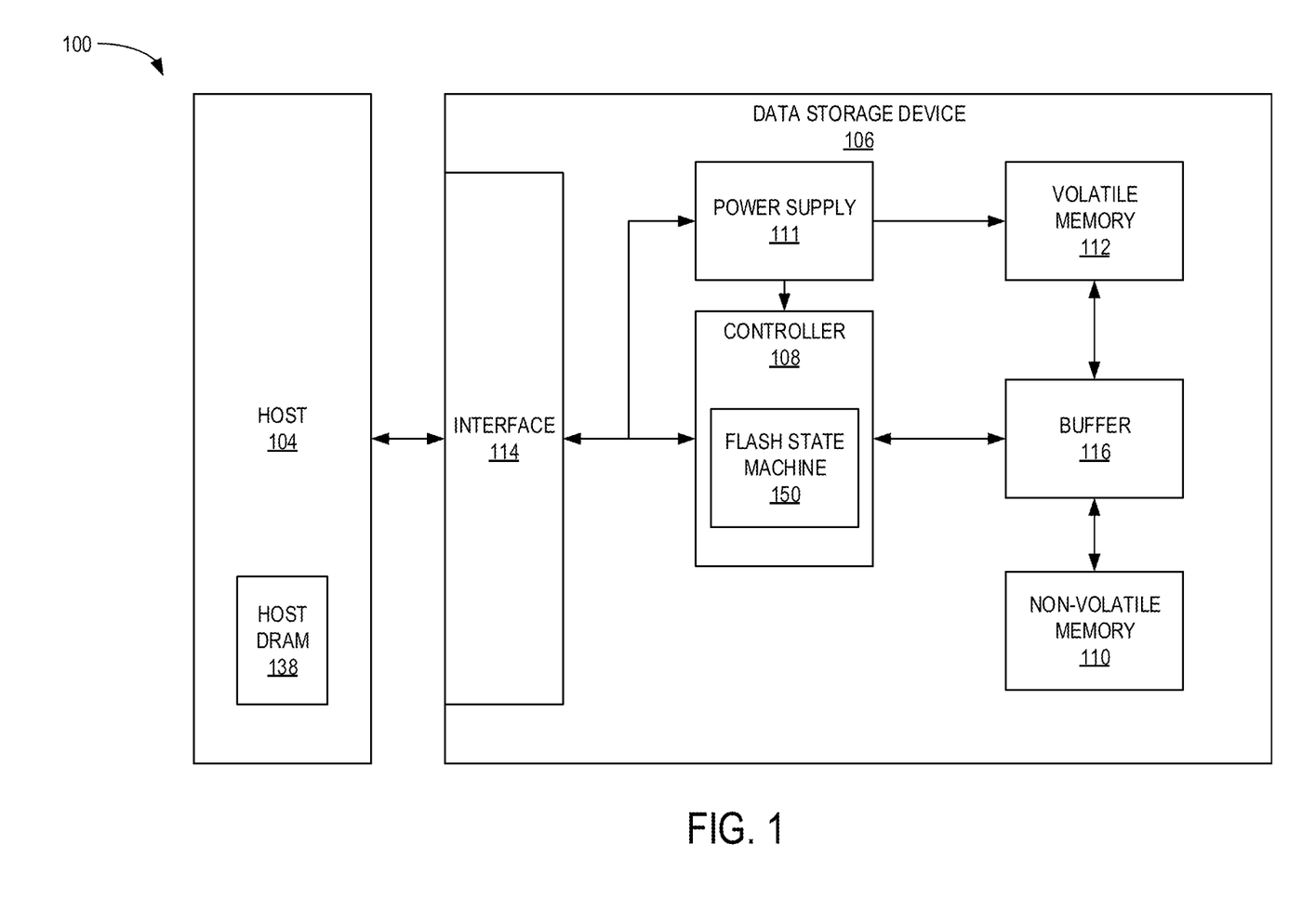
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 includes a flash state machine 150. The flash state machine 150 may be configured to sense data of a wordline, send program pulses to program data to a wordline, and determine whether a programming operation is near completion. The flash state machine may determine that a programming operation is near completion by determining an index of programming pulses and/or determining a number of cells of the wordline being programmed that has not yet been programmed (e.g., a threshold number of cells). The flash state machine 150 may be further configured to store the sensed data in the buffer 116. It is to be understood that the flash state machine may store the sensed data in an internal buffer of the controller 108, such as SRAM memory.

Furthermore, during a programming operation, the flash state machine 150 may sense the data of a previously programmed wordline that is adjacent and sequential to a wordline that will be or is currently being programmed. The flash state machine 150 may sense the previously programmed wordline prior to programming the wordline that is adjacent and sequential to the previously programmed wordline and store the sensed data in a first location of the buffer 116 (or, in some embodiments, an internal buffer of the controller 108). Likewise, during programming of the wordline that is adjacent and sequential to the previously programmed wordline, the flash state machine 150 may re-sense the previously programmed wordline and store the re-sensed data in a second location of the buffer 116 (or, in some embodiments, an internal buffer of the controller 108). It is to be understood that the buffer 116 may alternatively be DRAM, SRAM, or double data rate (DDR) memory. The re-sensing may occur during the middle of a programming operation or closer to an end of the programming operation.

The flash state machine 150 may compare the sensed data and the re-sensed data and determine if any bits are different between the sensed data and the re-sensed data. If there are any bits that are different between the sensed data and the re-sensed data, the flash state machine 150 may be configured to mark the bits that are different as a soft bit, which indicates that those bits have a high probability of being bad. In other words, bits that are marked as a soft bit may be avoided during a next programming operation due to a high likelihood of those bits having errors after programming, such as due to losing charge or program disturb. Furthermore, when the re-sensing occurs during the middle of a current program operation, the soft bit information may be saved to the current wordline being programmed as part of the current program operation.

In TLC memory, program disturb, during programming of a wordline, may affect the Er, A, and B cell states of an adjacently programmed wordline. However, the flash state machine 150 may determine whether the bits that are different are due to program disturb or something more significant that program disturb, such as degradation of the voltage gate of the cell.

Thus, when re-programming a previously programmed wordline, such as after the block having the previously programmed wordline has been erased, the flash state machine 150 may recall the location of the soft bits associated with the previously programmed wordline being re-programmed and skip the bits that are labeled as soft bits. Furthermore, a decoder of the controller 108 may utilize knowledge of where the soft bits are as part of the decoding operation, such that the decoder may utilize extra resources to decode the soft bits. Likewise, an encoder of the controller 108 may utilize knowledge of where the soft bits are to generate additional error correction code/parity data for the soft bit locations.

Figure 2:
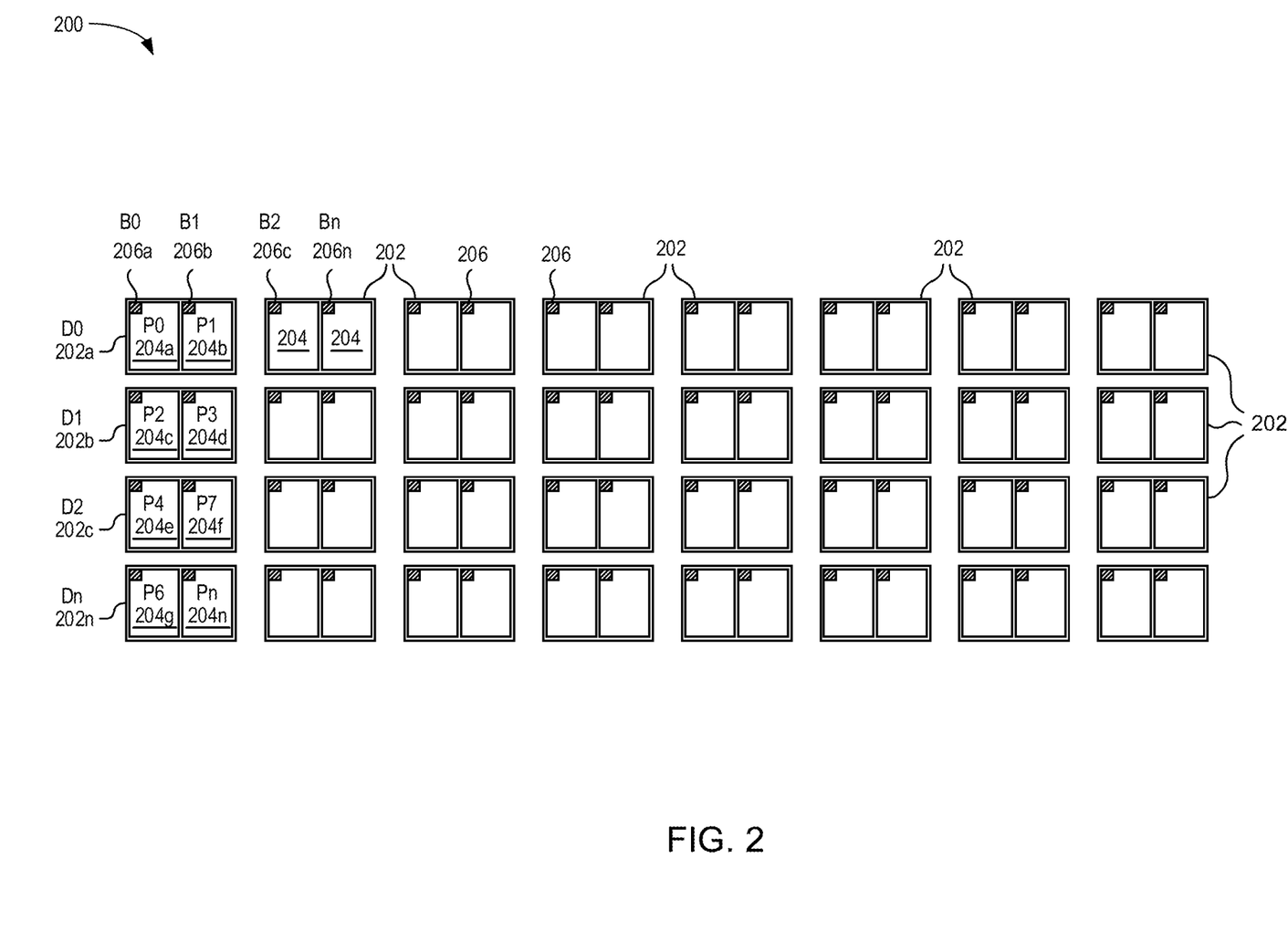
FIG. 2 is an exemplary illustration of a superblock of a memory device, according to certain embodiments.

FIG. 2 is an exemplary illustration of a memory device 200, according to certain embodiments. The memory device 200 includes a plurality of dies 202a-202n, collectively referred to as dies 202, where each die of the plurality of dies 202a-202n includes a first plane 204a and a second plane 204b, collectively referred to as planes 204. It is to be understood that each die include more than two planes (e.g., 4 planes, 8 planes, etc.). It is to be understood that the embodiments herein may be applicable to any die architecture having one or more planes. Each of the planes 204 includes a plurality of blocks 206a-206n, collectively referred to as block 206. While 32 dies 202 are shown in the memory device 200, any number of dies may be included.

When data is written to a block, such as the first block B0 206a, data is written sequentially by wordline. For example, if the first block B0 206a has a first programming operation having a data size equal to three wordlines, then the first wordline is programmed prior to programming the second wordline and the second wordline is programmed prior to programming the third wordline. Data may be erased from the memory device 200 in a block size.

The location of the data stored in an NVM, such as the NVM 110 of FIG. 1, is recorded in a logical to physical (L2P) table in a volatile memory unit, such as the volatile memory 112. The volatile memory 112 may be a DRAM unit. The L2P table include pointers that point to each physical location of the data within the NVM 110. The physical location of the data is mapped in a logical array, such that the pointer address array comprises the location mapped from die to NVM location. In a block, the total number of pointers is calculated as follows: 256 WL*3 Pages/WL*4 Slots/Page*1 pointer/slot=3,072 pointers. Within a first zone at capacity comprising 62 blocks, 190,464 pointers may exist (i.e., 3,072 pointers/block*62 blocks=190,464 pointers). Each pointer comprises a certain amount of data that utilizes the available storage of the volatile memory 112 and/or the NVM 110. Although TLC memory is exemplified, the embodiments herein are not limited to TLC memory and the embodiments described herein may be applicable to other memory densities, such as SLC memory, MLC memory, QLC memory, PLC memory, and the like.

Figure 3:
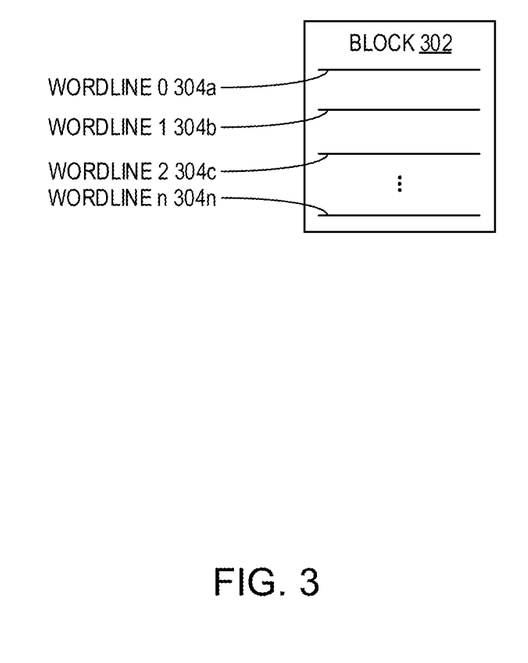
FIG. 3 is an exemplary illustration of a block of a memory device, according to certain embodiments.

FIG. 3 is an exemplary illustration of a block 302 of a memory device, such as the memory device 200 of FIG. 2, according to certain embodiments. The block 302 includes a plurality of wordlines 304a-304n. Wordlines of the block 302 are programmed sequentially, such that a first wordline 0 304a is programmed prior to programming a second wordline 1 304b, the second wordline 1 304b is programmed prior to programming a third wordline 2 304c, and so-forth. When programming the second wordline 1 304b, the programming operation may affect the first wordline 0 304a, which was previously programmed. The programming operation may cause a program disturb of the first wordline 0 304a. Additionally, due to the programming of the second wordline 1 304b, if any cells of the first wordline 0 304a are degraded, such that they may not be able to hold a charge as effectively, the programming of the second wordline 1 304b may cause the degraded cells of the first wordline 0 304a to lost charge, which may result in read errors or bit errors in the data.

Figure 4:
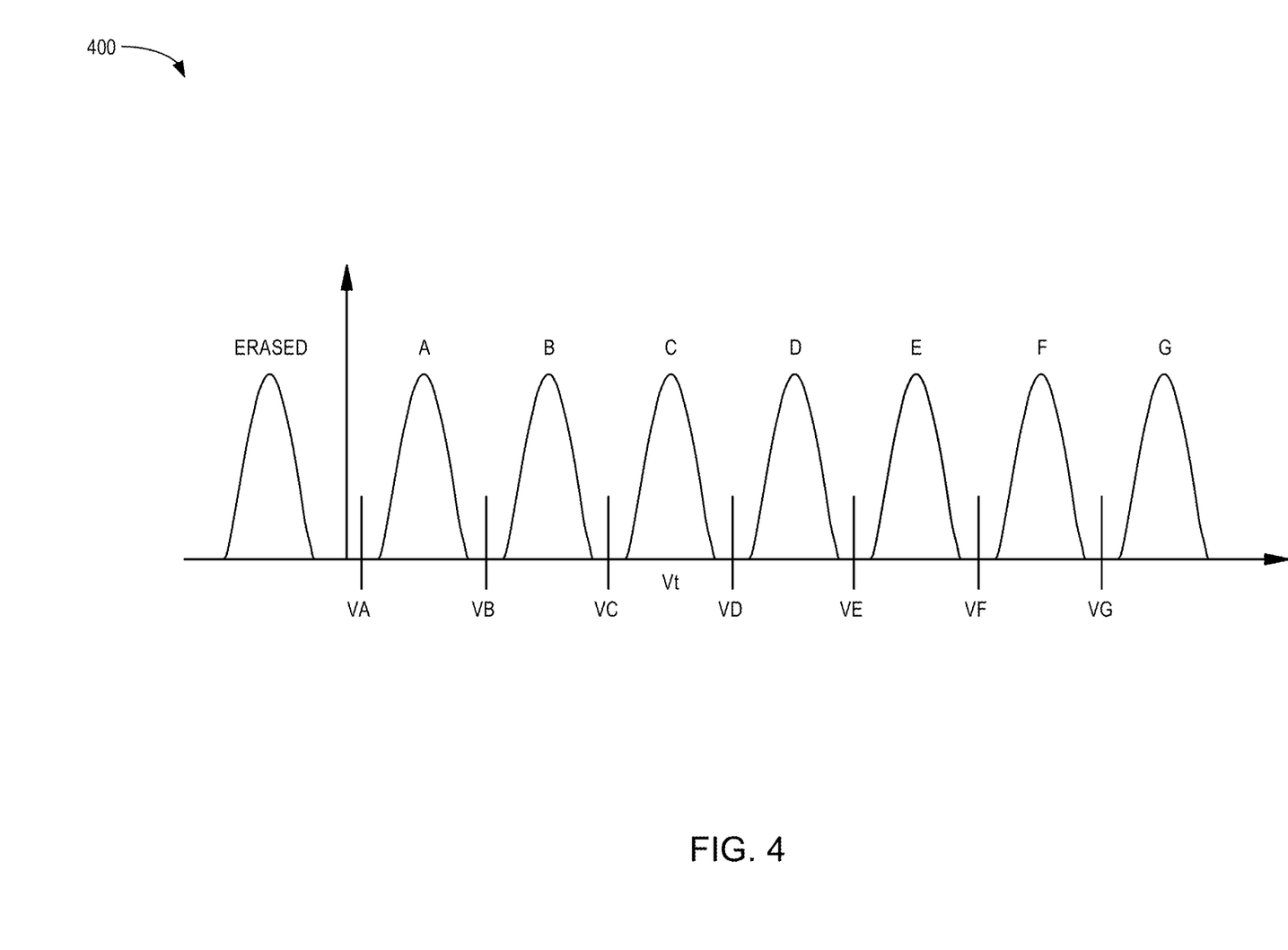
FIG. 4 is a graph illustrating threshold voltages for TLC memory, according to certain embodiments.

FIG. 4 is a graph 400 illustrating threshold voltages for TLC memory, according to certain embodiments. TLC memory includes 3 bits, where each bit may have a program state of either 0 or 1. The program state refers to the state of the memory cell, whether the memory cell is empty (i.e., no data exists) or the memory cell is programmed (i.e., data exists). Furthermore, the number of unique combinations of program states can be solved in the following equation: (Total number of voltage levels)=2^(number of bits per memory cell). For the TLC memory, the number of voltage levels is eight because 2^3=8.

As the number of bits of the memory cell increases, the memory cell can record more information leading to larger data storage. Furthermore, the equation for the unique combination of program states may be applied to SLC memory, MLC memory, QLC memory, penta-layer cell (PLC) memory, and other memory densities.

A program state of 0 refers to a programmed state, whereas a program state of 1 refers to an erased state. The TLC memory has 8 voltage levels, where one is erased and seven are programmed. Furthermore, the one voltage level that is erased has a bit combination of program state 111. For any memory cell, if the bit combination only contains the program state 1, then the program state is erased (e.g., 1 for SLC, 11 for MLC, and 1111 for QLC). Listing from lowest threshold voltage, denoted by Vt on the x-axis, to highest threshold voltage in FIG. 4, the voltage levels are 111 for the erased cell state, 110 for cell state A, 100 for cell state B, 000 for cell state C, 010 for cell state D, 011 for cell state E, 001 for cell state F, and 101 for cell state G.

The bits for the cell state (i.e., ###) are upper page, middle page, lower page. Furthermore, the lines between the curves are labeled VA, VB, VC, VD, VE, VF, and VG are related to the threshold or reference voltage. For other memory cells, the number of threshold or reference voltages can be solved by the following equation: (number of threshold or reference voltages)=(total number of voltage levels)−1. The individual pages of data can be read by performing a number of comparisons at one or more threshold points and determining whether the cell voltage is lower or higher than the threshold. Each voltage curve represents a voltage distribution for the respective cell state. It is to be understood that the cell state distribution curve is an example embodiment. It is to be further understood that a tail of the voltage curve of a cell state may overlap with a head of the voltage curve of an adjacent cell state and vice-versa.

When a program disturb occurs to a TLC cell memory, the program disturb may affect the A state, the B state, and the Erased state. As shown in FIG. 4, the corresponding curves for the A state, the B state, and the Erased state may be shifted to the left (i.e., negative voltage direction), shifted to the right (i.e., positive voltage direction), tightened, and/or loosed. It is to be understood that program disturb may affect other cell states other than the ones listed above.

Figure 5:
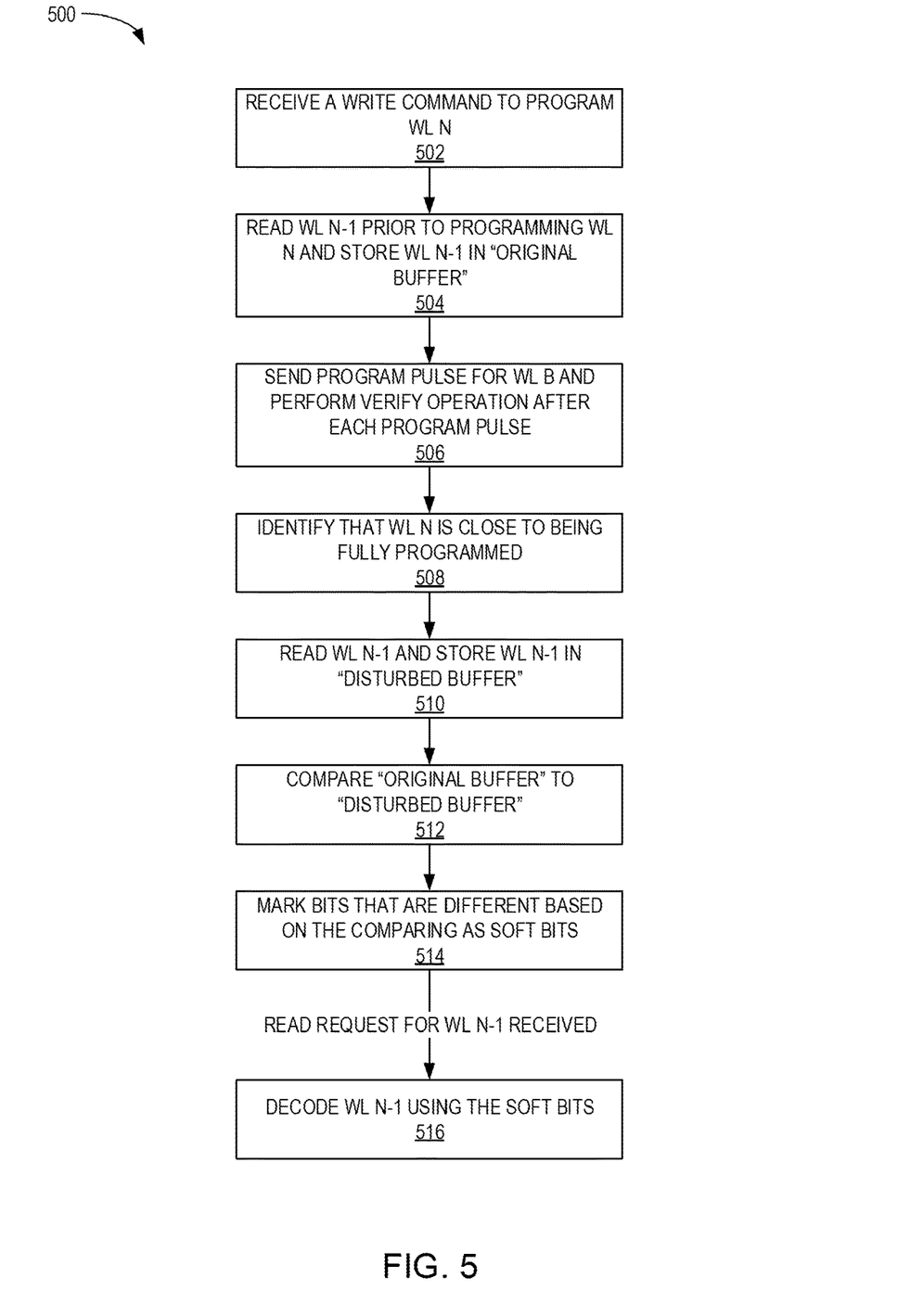
FIG. 5 is a flow diagram illustrating a method of determining soft-bits of a previously programmed wordline during a programming operation of a sequential and adjacent wordline to the previously programmed wordline, according to certain embodiments.

FIG. 5 is a flow diagram illustrating a method 500 of determining soft-bits of a previously programmed wordline during a programming operation of a sequential and adjacent wordline to the previously programmed wordline, according to certain embodiments. Method 500 may be implemented by a controller, such as the controller 108 of FIG. 1, having a flash state machine, such as the flash state machine 150 of FIG. 1. Furthermore, for exemplary purposes, the previously programmed wordline may be the second wordline 1 304*b* of FIG. 3 and the sequential and adjacent wordline may be the third wordline 2 304*c* of FIG. 3.

At block 502, the controller 108 receives a write command from a host device to write a command to program WL n. At block 504, the flash state machine 150 reads the WL n−1 prior to programming WL n and stores the data of WL n−1 in an "original buffer". The "original buffer" may be a first location of a buffer utilized by the flash state machine 150, such as SRAM, DRAM, and the like. At block 506, the flash state machine 150 sends a program pulse for WL B and performs a verify operation after each program pulse. At block 508, the flash state machine 150 identifies that the WL n is close to being fully programmed. In some examples, the flash state machine 150 may identify that the WL n is about halfway programmed.

At block 510, the flash state machine 150 reads WL n−1 and stores the data of WL n−1 in a "disturbed buffer". The "disturbed buffer" may be a second location of a buffer utilized by the flash state machine 150, such as SRAM, DRAM, and the like. The "original buffer" and the "disturbed buffer" may be located in a same volatile memory device or in different volatile memory devices. At block 512, the flash state machine 150 compares the data stored in the "original buffer" to the data stored in the "disturbed buffer". At block 514, the flash state machine 150 marks the bits that are different based on the comparing at block 512 as soft bits. When a read request for WL n−1 is received by the controller 108, the controller 108 may retrieve the soft bit information corresponding to WL n−1 and provide the soft bit information to a decoder, where the decoder utilizes the soft bit information to decode the data of WL n−1 at block 516.

By determining which bits are weak during a programming operation of a next wordline, handling of weak bits and decoding operations may be improved.

In one embodiment, a data storage device includes a non-volatile memory device having at least a first wordline and a second wordline, where the second wordline is sequential and adjacent to the first wordline, and where the first wordline comprises first data, a volatile memory device, and a controller coupled to the non-volatile memory device and the volatile memory device. The controller is configured to receive a write command to program second data to the second wordline, prior to programming the second data to the second wordline, read the first data from the first wordline and store the read first data in a first location of the volatile memory device, where the read first data includes a plurality of first bits, program the second data to the second wordline, during the programming, re-read the first data from the first wordline and store the re-read first data in a second location of the volatile memory device, where the re-read first data includes a plurality of second bits, compare the plurality of first bits to the plurality of second bits, and mark one or more bits of the first wordline that are different based on the comparing. The marked one or more bits are used as soft bits in future read and decode operations.

The first location and the second location are distinct. The controller is further configured to, when re-programming the first wordline, avoid programming the one or more bits marked as soft bits. Programming the second data to the second wordline includes sending a number of program pulses to the second wordline. The number of program pulses equals a number of cell states of a cell comprising the first wordline and the second wordline. The controller is further configured to perform a verify operation after each program pulse of the number of program pulses. The controller is further configured to identify that the programming the second data is near completion. The identifying includes determining a number of cells of the second wordline that has not yet been programmed and determining a difference between the number of cells of the second wordline that has not yet been programmed and a total number of cells of the second wordline. The re-reading occurs when the difference is less than or equal to a threshold number of cells. The controller is further configured to identify that the programming the second data is near completion. The identifying includes determining an index of a current programming pulse and determining a difference between the index of the current programming pulse and the number of program pulses to the second wordline. The re-reading occurs when the difference is less than or equal to a threshold number of program pulses. The mark one or more bits are stored either in a random access memory device or double data rate memory device. The controller is further configured to receive a read command for the first wordline, retrieve the stored marked one or more bits, and utilize the retrieved stored marked one or more bits in a decoding operation for the read command for the first data of the first wordline.

In another embodiment, a data storage device includes a memory device and a controller coupled to the memory device. The controller is configured to receive a write command for a wordline of the memory device, read a previously programmed wordline of the memory device, where the previously programmed wordline is adjacent to the wordline, store the read previously programmed wordline in a first buffer, execute the write command for the wordline, during the executing, re-read the previously programmed wordline, store the re-read previously programmed wordline in a second buffer, determine that one or more bits of the stored read previously programmed wordline are different than the stored re-read previously programmed wordline, and mark the one or more bits of the previously programmed wordline that are different based on the determining, and store a location corresponding to the marked one or more bits of the previously programmed wordline that are different in a volatile memory device of the data storage device.

The volatile memory device is disposed in the controller. The controller is further configured to utilize the location corresponding to the marked one or more bits that are different during a decoding operation of the previously programmed wordline. The marked one or more bits that are different indicates that the one or more bits that are different are affected by a program disturb due to executing the write command. The marked one or more bits that are different indicates that the one or more bits that are different lost charge during the executing the write command. The controller is configured to generate additional error correction code for data programmed to the location corresponding to the marked one or more bits that are different.

In another embodiment, a data storage device includes non-volatile memory means, volatile memory means, and a controller coupled to the non-volatile memory means and the volatile memory means. The controller includes a flash state machine. The flash state machine is configured to receive a write command to write second data to a second wordline, where the second wordline is sequential and adjacent to a first wordline, read first data of the first wordline for a first time, program the second write data to the second wordline, read the first data of the first wordline for a second time, compare the first data read for the first time to the first data read for the second time, mark one or more bits of the first wordline that are different based on the comparing, and store location information of the marked one or more bits in volatile memory means.

Reading the first data of the first wordline for the second time occurs during programming the second write data to the second wordline. The first data read for the first time is stored in a first location of the volatile memory means. The first data read for the second time is stored in a second location of the volatile memory means. The first location and the second location are distinct.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a non-volatile memory device comprising at least a first wordline and a second wordline, wherein the second wordline is sequential and adjacent to the first wordline, and wherein the first wordline comprises first data;
a volatile memory device; and
a controller coupled to the non-volatile memory device and the volatile memory device, wherein the controller is configured to:
receive a write command to program second data to the second wordline;
prior to programming the second data to the second wordline, read the first data from the first wordline and store the read first data in a first location of the volatile memory device, wherein the read first data comprises a plurality of first bits;
program the second data to the second wordline;
during the programming, re-read the first data from the first wordline and store the re-read first data in a second location of the volatile memory device, wherein the re-read first data comprises a plurality of second bits;
compare the plurality of first bits from the first location of the volatile memory device to the plurality of second bits from the second location of the volatile memory device to identify one or more bits of the plurality of first bits that are different from one or more bits of the plurality of second bits;
mark the one or more bits that are different; and
read and decode the marked one or more bits.

2. The data storage device of claim 1, wherein the first location and the second location are distinct.

3. The data storage device of claim 1, wherein the controller is further configured to, when re-programming the first wordline, not program the marked one or more bits.

4. The data storage device of claim 1, wherein programming the second data to the second wordline comprises sending a number of program pulses to the second wordline, and wherein the number of program pulses equals a number of cell states of a cell comprising the first wordline and the second wordline.

5. The data storage device of claim 4, wherein the controller is further configured to perform a verify operation after each program pulse of the number of program pulses.

6. The data storage device of claim 4, wherein the controller is further configured to identify that the programming the second data is near completion, wherein the identifying comprises:
determining a number of cells of the second wordline that has not yet been programmed; and
determining a difference between the number of cells of the second wordline that has not yet been programmed and a total number of cells of the second wordline.

7. The data storage device of claim 6, wherein the re-reading occurs when the difference is less than or equal to a threshold number of cells.

8. The data storage device of claim 4, wherein the controller is further configured to identify that the programming the second data is near completion, wherein the identifying comprises:
determining an index of a current programming pulse; and
determining a difference between the index of the current programming pulse and the number of program pulses to the second wordline.

9. The data storage device of claim 8, wherein the re-reading occurs when the difference is less than or equal to a threshold number of program pulses.

10. The data storage device of claim 1, wherein the marked one or more bits are stored either in a random access memory device or double data rate memory device.

11. The data storage device of claim 10, wherein the controller is further configured to:
receive a read command for the first wordline;
retrieve the stored marked one or more bits; and
utilize the retrieved stored marked one or more bits in a decoding operation for the read command for the first data of the first wordline.

12. A data storage device, comprising:
a memory device; and
a controller coupled to the memory device, wherein the controller is configured to:
receive a write command for a wordline of the memory device;
read a previously programmed wordline of the memory device, wherein the previously programmed wordline is adjacent to the wordline;
store the read previously programmed wordline in a first buffer in volatile memory;
execute the write command for the wordline;

during the executing, re-read the previously programmed wordline;
store the re-read previously programmed wordline in a second buffer in the volatile memory;
determine that one or more bits of the stored read previously programmed wordline that is in the first buffer in the volatile memory are different than the stored re-read previously programmed wordline that is in the second buffer in the volatile memory to identify one or more bits of the stored read previously programmed wordline that are different from one or more bits of the stored re-read previously programmed wordline;
mark the one or more bits that are different;
read and decode the marked one or more bits; and
store a location of the marked one or more bits in a volatile memory device of the data storage device, wherein the marked one or more bits are used as soft bits, wherein the soft bits are read and provided to a decoder for decode operations.

13. The data storage device of claim 12, wherein the volatile memory device is disposed in the controller.

14. The data storage device of claim 12, wherein the controller is further configured to utilize the location during a decoding operation of the previously programmed wordline.

15. The data storage device of claim 12, wherein the marked one or more bits indicates that the one or more bits that are affected by a program disturb due to executing the write command.

16. The data storage device of claim 12, wherein the marked one or more bits indicates that the one or more bits lost charge during the executing the write command.

17. The data storage device of claim 12, wherein the controller is configured to generate additional error correction code for data programmed to the location corresponding to the marked one or more bits.

18. A data storage device, comprising:
non-volatile memory means;
volatile memory means; and
a controller coupled to the non-volatile memory means and the volatile memory means, wherein the controller comprises a flash state machine, and wherein the flash state machine is configured to:
receive a write command to write second data to a second wordline, wherein the second wordline is sequential and adjacent to a first wordline;
read first data of the first wordline for a first time and store the read first data from the first time in the volatile memory means;
program the second write data to the second wordline;
read the first data of the first wordline for a second time and store the read first data from the second time in the volatile memory means;
compare the first data read for the first time from the volatile memory means to the first data read for the second time from the volatile memory means to identify one or more bits of the first data read for the first time that are different from one or more bits of the first data read of the second time;
mark the one or more bits that are different;
read and decode the marked one or more bits; and
store a location of the marked one or more bits in the volatile memory means, wherein the marked one or more bits are used as soft bits, wherein the soft bits are read and provided to a decoder for decode operations.

19. The data storage device of claim 18, wherein the reading the first data of the first wordline for the second time occurs during programming the second write data to the second wordline.

20. The data storage device of claim 18, wherein:
the first data read for the first time is stored in a first location of the volatile memory means;
the first data read for the second time is stored in a second location of the volatile memory means; and
the first location and the second location are distinct.

* * * * *